(No Model.)

G. O. BOYNTON & F. C. JOHNSON.
METHOD OF PROVIDING PROTECTION FOR THE ENDS OF BOBBINS, &c.

No. 379,151. Patented Mar. 6, 1888.

WITNESSES.
Percy Bryant.
C. E. Nichols.

INVENTORS —
Geo. O. Boynton.
Frank C. Johnson.
per Edwin W. Brown,
Attorney.

UNITED STATES PATENT OFFICE.

GEORGE O. BOYNTON AND FRANK C. JOHNSON, OF BOSTON, MASSACHUSETTS.

METHOD OF PROVIDING PROTECTION FOR THE ENDS OF BOBBINS, &c.

SPECIFICATION forming part of Letters Patent No. 379,151, dated March 6, 1888.

Application filed May 4, 1887. Serial No. 237,110. (No model.)

*To all whom it may concern:*

Be it known that we, GEORGE O. BOYNTON and FRANK C. JOHNSON, of Boston, in the county of Suffolk and State of Massachusetts, have invented certain new and useful Improvements in the Method of Providing Protection for the Ends of Bobbins, &c., of which the following is a full, clear, and exact description.

This invention consists of a method providing protection for one or both ends of a bobbin or spool for spinning-machines, consisting of electrically depositing on one or both ends of such bobbins or spools any suitable metal, all substantially as hereinafter fully described.

In the accompanying plate of drawings is illustrated the present invention as applied to several forms of bobbins and a spool for spinning-machines.

Figure 1:
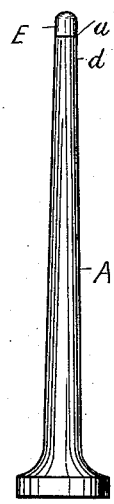
Figure 2:
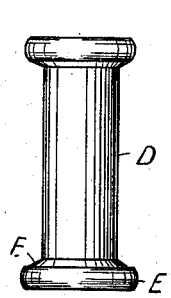
Figure 3:
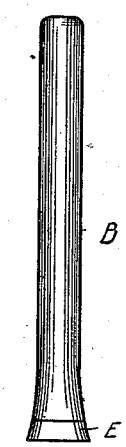
Figure 4:
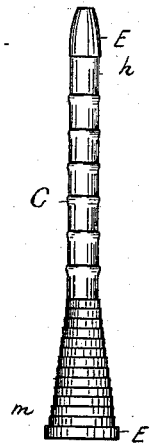
Figure 5:
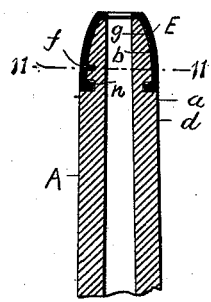
Figure 7:
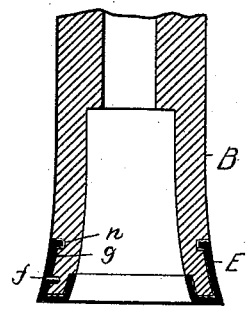
Figure 8:
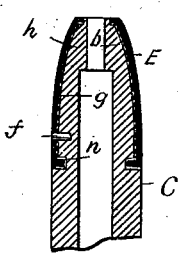
Figure 6:
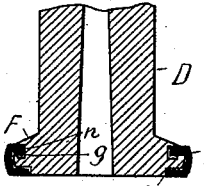
Figure 9:
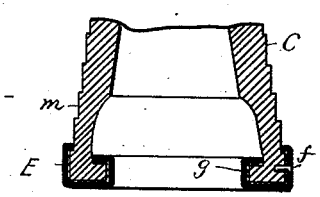
Figure 11:
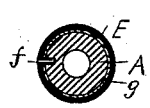
Figure 10:
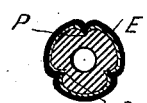

Figures 1, 3, and 4 represent in side view bobbins, and Fig. 2 a spool for spinning-machines. Fig. 5 is a detail central longitudinal section of the upper end of the bobbin shown in Fig. 1; and Figs. 6 and 7 are detail central longitudinal sections of the lower ends of the spool and bobbin shown in Figs. 2 and 3, respectively. Figs. 8 and 9 are detail central longitudinal sections of the upper and lower ends, respectively, of the bobbin shown in Fig. 4. Fig. 10 is a cross-section, to be hereinafter referred to; Fig. 11, a cross section on line 11 11, Fig. 5. Figs. 5 to 11, both inclusive, are enlarged.

In the drawings, A represents a bobbin for use in spinning wool, B and C bobbins for use in spinning cotton, and D a spool for spinning silk, all made of wood and constructed and arranged for operation in a spinning-machine, as usual, and needing no particular description herein, except so far as relates to the present invention.

E represents a ring or thimble or sleeve of metal—preferably of copper—applied to the ends of the bobbins and spools, as shown.

The bobbin A, Figs. 1 and 5, is made of the usual and desired size and shape, and then its upper end, *a*, where the metal is to be applied, is first turned off, as at *b*, reducing its diameter at such end, as shown, for the deposit of the metal, E, thereon and to have it flush with the surface *d*, and then a short piece of wire, *f*, of any suitable metal that is a good conductor of electricity, is inserted in the wood projecting therefrom a short distance, and then the place so turned down is coated or covered with a coating or slight thickness, *g*, of any suitable metallic varnish—for instance, a varnish made of powdered bronze mixed with any suitable varnish, preferably an oil-varnish, the bronze or metallic portion of the varnish being of a metal that is a good conductor of electricity.

To the wire *f* is attached an electric wire in any suitable manner, which electric wire leads and is connected to one pole of an electric battery, and then a coating of wax or paraffine is applied to that portion of the wood that is above the place where the metallic varnish is applied, to prevent the acid of the solution from acting upon or injuring the wood of the bobbin. The bobbin so prepared, by its end *a*, is immersed in a solution properly prepared for the depositing of metal by electricity, and having immersed therein the metal (which, preferably, is copper) to be applied to the bobbin, which metal is connected by a suitable wire to the other pole of the battery, all as usual in the depositing of metal by electricity, the bobbin being supported in the solution by the electric wire attached thereto, or in any suitable manner. When the metal is deposited on the bobbin to the thickness desired, the bobbin is removed from the solution and disconnected from the electric wire, the small wire *f* then cut off to the surface of the deposited metal, the bobbin properly cleaned, and then the metal portion E trued up in a lathe to make it flush with the bobbin, as shown, or as desired.

The spool B (shown in Figs. 2 and 6 in detail) has one, F, of its flanges prepared and covered with the copper in a similar manner to the end *a* of the bobbin A, the flange being turned or reduced to have it of the same size when covered as its other flange.

The bobbin B (shown in Figs. 3 and 7) has its lower end prepared and covered or protected with metal in a similar manner to the end *a* of bobbin A.

The bobbin shown in Fig. 4 has its upper end, *h*, as shown in Fig. 8, prepared and covered or protected with copper, like the upper end, $a$, of the bobbin A in Figs. 1 and 5, and its lower end, $m$, as shown in Fig. 9, prepared and covered or protected with copper, like the lower end of the bobbin shown in Figs. 3 and 7.

To prevent accidental detachment of the metal, E, from the ends of the bobbins and spool-flange if it should become loose from shrinkage of the wood, or from any cause, it is preferable in preparing the ends to turn or cut a circumferential groove in the outer surface of the bobbins and spool flange, as shown at $n$ in the several figures, whereby the metal will be deposited in the grooves, and therefore insure its closer and better attachment. The grooves need only extend part way around, and instead of grooves any suitable depressions or serrations can be used.

In Fig. 10 the bobbin is shown as having longitudinal grooves P, which grooves can be long or short, according to the extent of the metal thereon, which, when filled with the deposited metal, prevent its turning on the bobbin. The wire $f$ serves also as a rivet and prevents detachment of the metal, although its special use is to give means of attaching the electric wire for the necessary electric current; but this can be done in other ways—for instance, by winding a wire over the metallic varnish.

In lieu of copper, any suitable metal can be used that can be deposited by electricity, and any suitable apparatus for depositing the metal by electricity can be used.

Covering or protecting a bobbin or spool for spinning-machines with metal by means of electricity, substantially as herein described, secures the metal closely and firmly to the wood of which the bobbin is made, and the metal prevents the wood from splitting or cracking in use, and when applied to its upper end it makes a smooth finish, whereby the silk or other threads are not retarded or interfered with in delivery therefrom.

Having thus described our invention, what we claim is—

1. The method of providing protection for one or both ends of a bobbin or spool for spinning-machines, consisting of electrically depositing any suitable metal thereon, for the purpose specified.

2. The method of providing protection for one or both ends of a bobbin or spool for spinning-machines, consisting of electrically depositing any suitable metal thereon and then finishing up the same, for the purpose specified.

3. The method of providing protection for one or both ends of a bobbin or spool for spinning-machines, consisting of turning off or reducing the end of the bobbin and then electrically depositing thereon at such end any suitable metal, and then finishing up the same, substantially as and for the purpose specified.

In testimony whereof we have hereunto set our hands in the presence of two subscribing witnesses.

GEORGE O. BOYNTON.
FRANK C. JOHNSON.

Witnesses:
EDWIN W. BROWN,
PERCY BRYANT.